United States Patent [19]
Bi

[11] Patent Number: 5,136,612
[45] Date of Patent: Aug. 4, 1992

[54] METHOD AND APPARATUS FOR REDUCING EFFECTS OF MULTIPLE ACCESS INTERFERENCE IN A RADIO RECEIVER IN A CODE DIVISION MULTIPLE ACCESS COMMUNICATION SYSTEM

[75] Inventor: Qi Bi, Morris Plains, N.J.

[73] Assignee: AT&T Bell Laboratories, Murray Hill, N.J.

[21] Appl. No.: 636,325

[22] Filed: Dec. 31, 1990

[51] Int. Cl.⁵ .............................................. H04K 1/00
[52] U.S. Cl. ....................................... 375/1; 375/102; 380/34; 370/18
[58] Field of Search ..................... 375/1, 38, 104, 103, 375/102; 380/33, 34, 40; 370/120, 123, 18; 455/50, 63, 59

[56] References Cited

U.S. PATENT DOCUMENTS

| | | | |
|---|---|---|---|
| 4,528,674 | 7/1985 | Sweeney et al. | 375/1 |
| 4,736,390 | 4/1988 | Ward et al. | 375/1 X |
| 4,841,527 | 6/1989 | Raychaudhuri et al. | 375/1 X |
| 4,901,307 | 2/1990 | Gilhousen et al. | |

*Primary Examiner*—Tod R. Swann
*Attorney, Agent, or Firm*—A. G. Steinmetz

[57] ABSTRACT

A CDMA system embodying apparatus and methods operates to reduce the effects of the multiple access interference in order to increase the channel capacity and achieve greater efficiency in the use of a given frequency bandwidth. Reception of CDMA radio transmissions is in multiple stages is which the multiple access interference is estimated after the first stage. This estimated multiple access interference is subtracted from the original received input, and the detection of the intended signal is performed on the signal having the reduced multiple access interference.

7 Claims, 9 Drawing Sheets

METHOD AND APPARATUS FOR REDUCING EFFECTS OF MULTIPLE ACCESS INTERFERENCE IN A RADIO RECEIVER IN A CODE DIVISION MULTIPLE ACCESS COMMUNICATION SYSTEM

FIELD OF THE INVENTION

This invention relates to cellular and wireless radio communication systems, and in particular to communication systems utilizing Code Division Multiple Access (CDMA) in a Direct Sequence Spread Spectrum System (DSSS).

BACKGROUND OF THE INVENTION

Presently three main systems of radio transmission are used in radiotelephone communication systems. Each of these systems are intended to make the most efficient use of the allocated frequency spectrum for radio telephone service.

Frequency Division Multiple Access (FDMA) is presently the oldest and most predominant transmission technology used for radiotelephone communication systems. With FDMA the available frequency is divided into many sub-bands. Each individual sub-band serves as an individual radiotelephone communication channel. The transmission and receiving equipment differentiates the different channels by using bandpass filtering techniques.

The transmission technology proposed for recent radiotelephone communication systems uses Time Division Multiple Access (TDMA) for differentiating the various individual channels. In TDMA a period of transmission time is divided into a plurality of time slots. Each communication channel is defined as a particular time slot within that period of transmission time.

When Code Division Multiple Access (CDMA) is used in a radiotelephone transmission system in which all the channels are broadcast at a common broadband frequency, each channel is differentiated by a unique spreading code. The signal is modulated with a spreading code before it is transmitted. The application of the spreading code converts the signal into a broadband signal which is transmitted. Application of this spreading code at the receiver to the received broadband signal demodulates the broadband signal and allows recovery of the information signal of that particular spreading code. This spreading code is typically a binary code comprised of binary bits. The bit pulse intervals are called "chips", which is the technical expression for the pulse periods.

CDMA, in contrast to FDMA and TDMA, advantageously allows each signal to use all of the available time and bandwidth. Since the spreading code uniquely identifies each channel, signals in the other channels appear as noise after the received signal is demodulated by the spreading code.

A widely used CDMA communication system is disclosed in the U.S. Pat. No. 4,901,307 issued Feb. 13, 1990 and entitled "Spread Spectrum Multiple Access Communication System Using Satellite of Terrestrial Repeaters". In the DSSS system each information bit is modulated by a pseudo-random noise sequence (PN sequence) before it is modulated for radio transmission. The modulation with the PN sequence is designated as a spreading process because it produces a signal having a very wide bandwidth compared with the information signal. This same identical wide bandwidth is shared by all the users of a particular communication system.

Such a CDMA system is intrinsically an anti interference system in that any multipath interference having a delay longer than one bit duration of the PN sequence is reduced to a noise level. With the same wide bandwidth available to all users, it permits the use of sophisticated channel coding techniques in order to achieve a very low energy to noise density ratio $E_b/N_0$ on a per bit basis. This advantageously reduces the interference of the overall system and hence increases the channel capacity of the system. By judicious control of the transmission power, frequency reuse efficiency can be significantly increased as compared with a FDMA system.

As compared with FDMA and TDMA systems in which system capacity is limited by the number of frequency sub-bands and number of time slots, the capacity of a CDMA system is limited by the code generated interference of the non-information signals between users of the system. As the number of users increases the non-information interference increases. This particular interference is designated multiple access interference. This interference is generated in part by application of a despreading code to the non-information portion of the signal received by the receiver. System capacity is determined to a significant extent by this multiple access interference. Hence a direct reduction in the effects of this multiple access interference can greatly increase system channel capacity.

Some existing CDMA systems have found ways to reduce the multiple access interference as a means of increasing channel capacity. These techniques use orthoginal functions as a means of reducing multiple access interference. However these existing techniques are only applicable to CDMA systems in which all the signals can be synchronized. When the signals are not synchronized such as in the reverse link of a cellular radiotelephone system, this method is not effective.

SUMMARY OF THE INVENTION

A CDMA system embodying apparatus and methods operates to reduce the effects of the multiple access interference in order to increase the system capacity and achieve greater efficiency in the use of a given frequency bandwidth. Reception of CDMA radio transmissions has a multiple stage structure in which the multiple access interference is estimated in the second stage. This estimated multiple access interference is subtracted from the original received input, and the detection of the intended signal is performed on the signal having the reduced multiple access interference.

In one particular cell site radio receiver apparatus, embodying the principles of the invention, all incoming signals are demodulated, despread and detected. The detected signals are all classified into those signals which are most likely correct and those which not likely to be correct. These initially detected signals are all stored in a memory buffer. The detection process is repeated. The spread waveforms corresponding to the correct outputs are regenerated and subtracted from the original received signal to remove a portion of the multiple access interference. The outputs deemed unlikely to be correct are re-detected in a second stage of the receiver. This resultant output may be used to overwrite the unlikely outputs to secure a more likely information signal.

In some embodiments the radio receiver may include several stages of re-detection in which the output of a previous stage is divided into likely and unlikely outputs in which the unlikely outputs are successively overwritten in several stages of the receiver.

DETAILED DESCRIPTION

Figure 1:
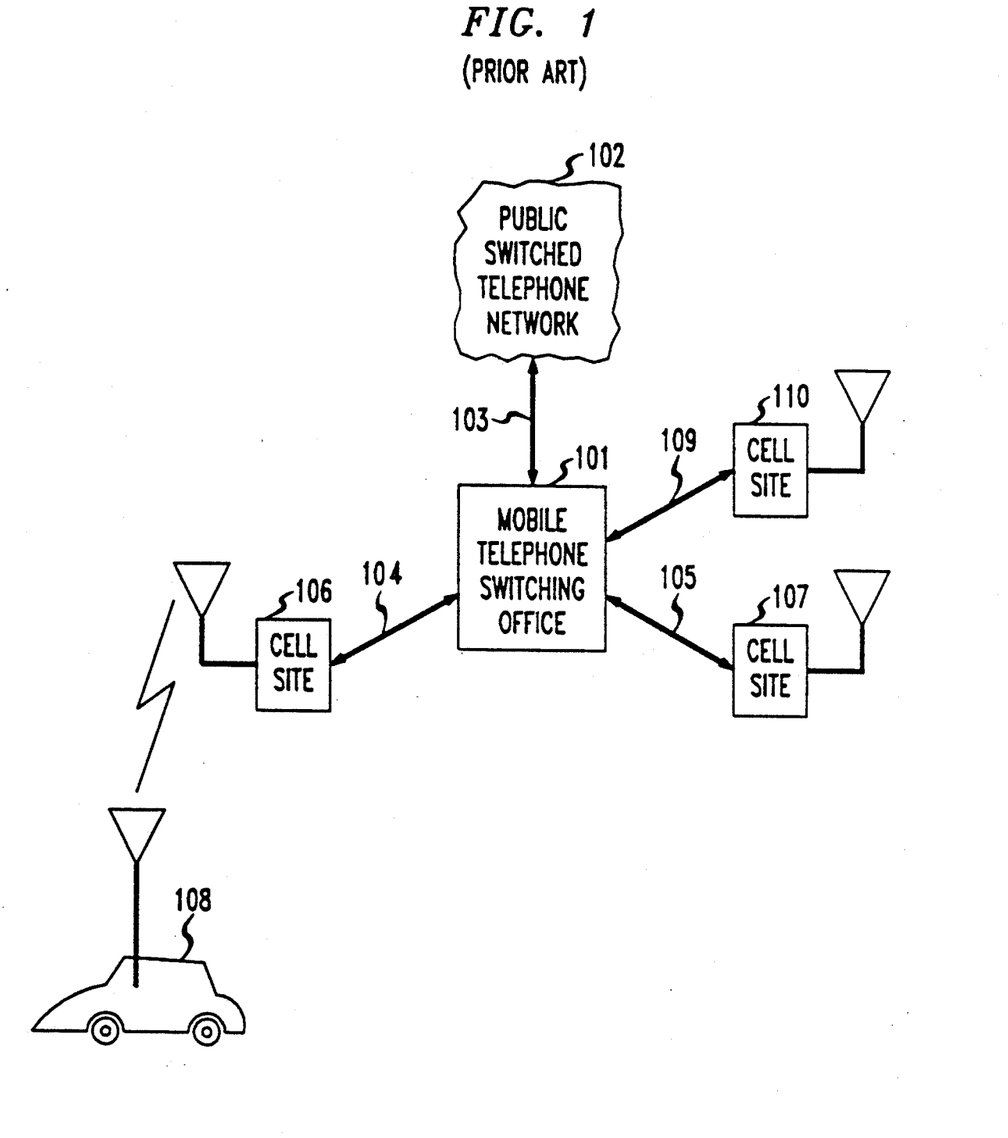
FIG. 1 is a block diagram of a typical cellular radio telephone system.

A block diagram of a typical cellular mobile telephone system is shown in FIG. 1. A mobile telephone switching office 101 is coupled to a land public switched telephone network 102, via a trunk 103. The mobile switching office is also connected by the trunks 104, 105 and 109 to the cell-sites 106, 107 and 110 which include radio transceivers with antenna means for communicating with mobile radiotelephone units 108 by radio signals. Each mobile radiotelephone communicates with a single corresponding cell-site as determined by the best quality signal propagation between cell site and mobile radiotelephone as defined by signal propagation rules within the cellular system. The operation of such cellular systems is well known in the art and it is not believed necessary to describe these operational details.

The mobile 108 communicates with the cell-site 106 best suited for such communication on the basis of transmission signal quality. Communication from a mobile to a cell-site uses a radio transmission link that is normally designated as the reverse link. Communication from the cell-site to the mobile utilizes a radio transmission link designated as the forward link. Normally there is only one forward link and one reverse link between a mobile and a cell-site. Calls received by a cell-site from a mobile are transmitted to the mobile switching office 101 which in turn transmits it to the public switched telephone network.

Figure 2:
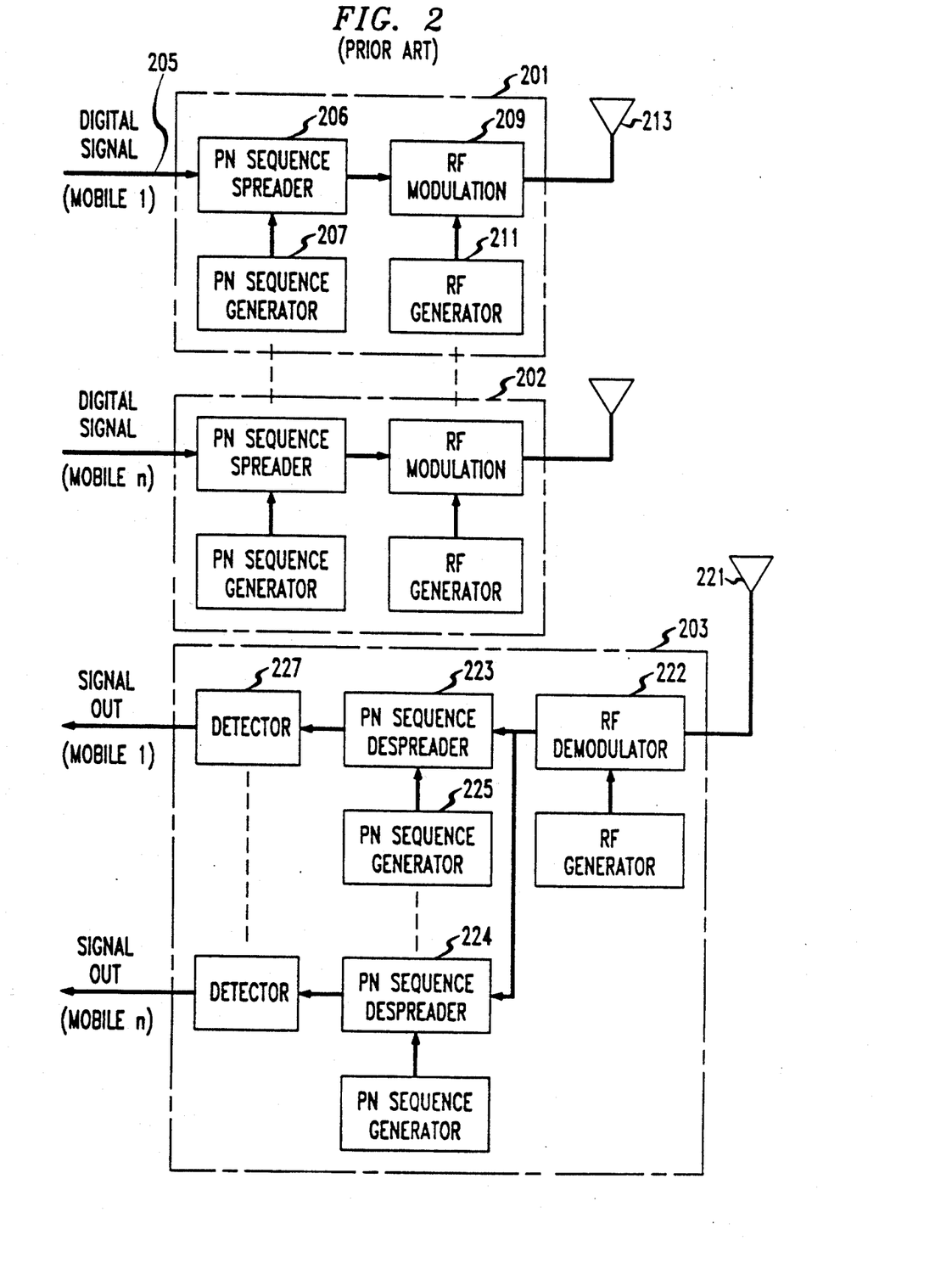
FIG. 2 is a block diagram of a transmission system, embodying CDMA techniques, used in the system of FIG. 1.

A block diagram of typical CDMA communications transmitting and receiving equipment operative in the reverse link is shown in the FIG. 2. This arrangement shows the transmission equipment for two separate mobile radiotelephone units 201 and 202 of a plurality of mobile units and a cell-site receiver 203. Since both mobile radiotelephone units 201 and 202 are identical, only the unit 201 is described in detail. Voice and/or data signals to be transmitted are applied at the input lead 205 and applied to a PN sequence spreader 206. The PN sequence spreader 206 multiplies the input signal with a Pseudo-noise (PN) sequence generated by the PN sequence generator 207 and which is unique to the mobile unit 201. This PN sequence is typically a binary code having random $+V$ and $-V$ values generated at a frequency greatly exceeding the frequency or bit rate of the incoming signal on lead 205. The signal is spread by the PN sequence and the resulting spread signal has a high frequency or chip rate. This signal is modulated for transmission by the RF modulation circuit 209 at a frequency supplied by the RF generator 211. This modulated signal is coupled to the transmitting antenna 213 of the mobile.

The second mobile telephone unit 202 operates in a manner similar to the mobile unit 201. It however uses a different PN sequence which uniquely defines its particular transmission channel.

The signals transmitted by the mobile unit 201, as well as the signals transmitted by the mobile unit 202 and other active mobile units, are received by the antenna 221 of the cell-site. These received signals are applied to many receiving branches each of which is dedicated to detecting the signal of a particular transmission channel. The received signals are demodulated by the RF demodulator 222 and coupled to a plurality of PN sequenced despreaders including the illustrated despreaders 223 and 224. Each despreader has a PN sequence input corresponding to a different transmission channel. In the instance of the first mobile unit the received signal is recovered by multiplying the received signal in the PN sequence despreader 223 by the PN sequence, of that mobile's transmission channel, which is generated by the PN sequence generator 225. The resulting information signal is determined by the detector 227 which is dedicated to the channel associated with the mobile unit 201. The parallel reception system including the PN sequence despreader 224 is dedicated to the channel associated with the mobile 202.

Figure 3:
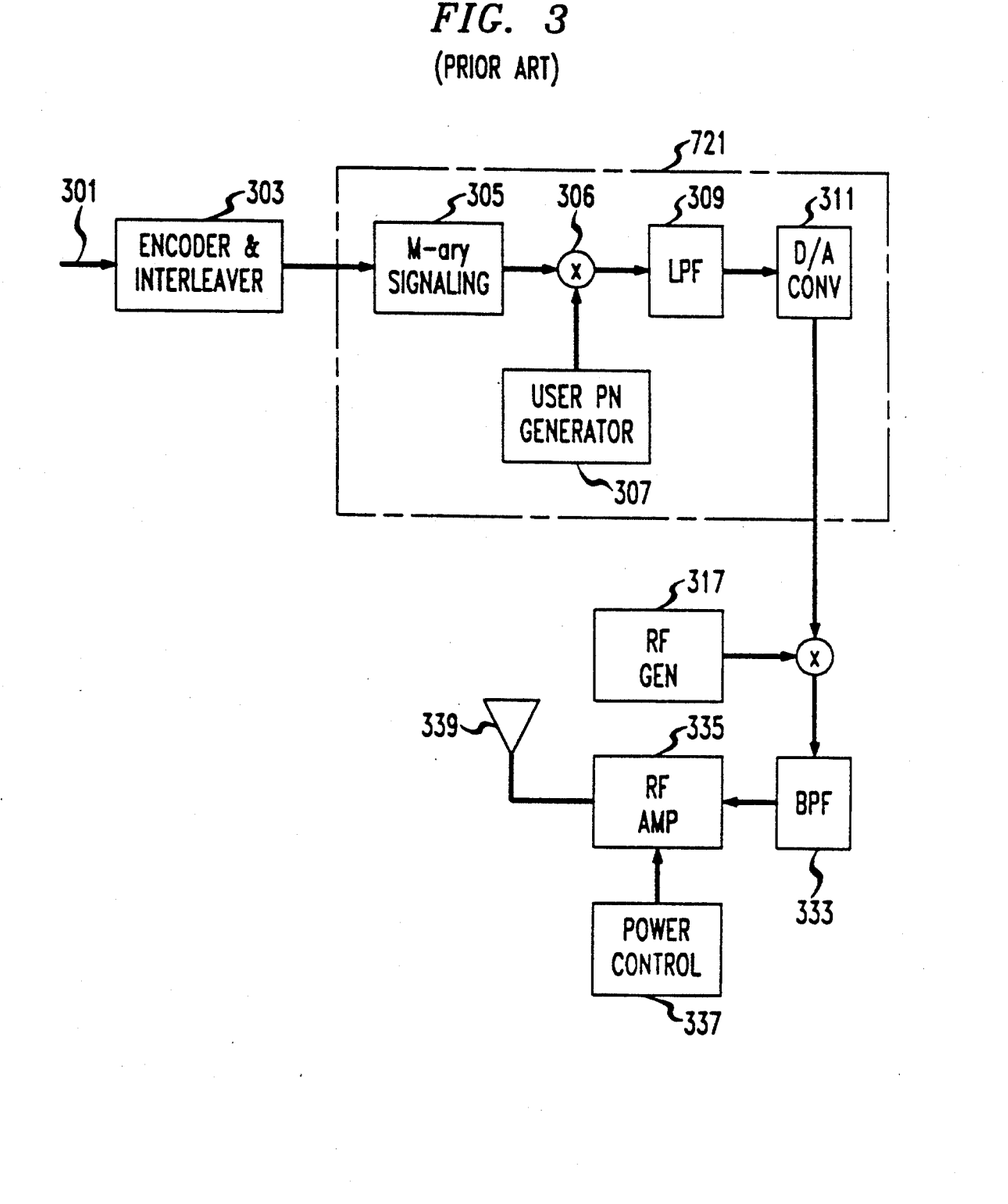
FIG. 3 is a detailed block diagram of a radio transmitter used in the CDMA system of FIG. 2.

A detailed embodiment of a mobile radio transmitter for use in a CDMA transmission system is shown in FIG. 3. An encoded digital speech signal is applied to the input 301. This signal is encoded for noise and interference protection and interleaved to reduce the effects of burst errors in the encoder and interleaver 303. The interleaved signal is modulated using M-ary orthoginal signaling, where M is an integer, in the circuit 305. In the illustrative embodiment M with orthoginal Walsh sequences are used for such a purpose. The modulated signal is spread in the multiplier 306 (e.g. an exclusive OR gate) in response to the user's unique PN sequence supplied by the PN sequence generator 307. The spread signal is filtered by the low pass filter 309, converted to analog form in the digital-to-analog converter 311 and raised in frequency to the RF transmitting frequency in the multiplier 313 in response to the RF generator 317. The RF signal is passed through a band pass filter 333, amplified by an RF amplifier 335 and coupled to the antenna 339 for transmission. Transmission power is controlled by the power control 337 which is operative to control transmission power in order to reduce inter-channel interference.

Figure 4:
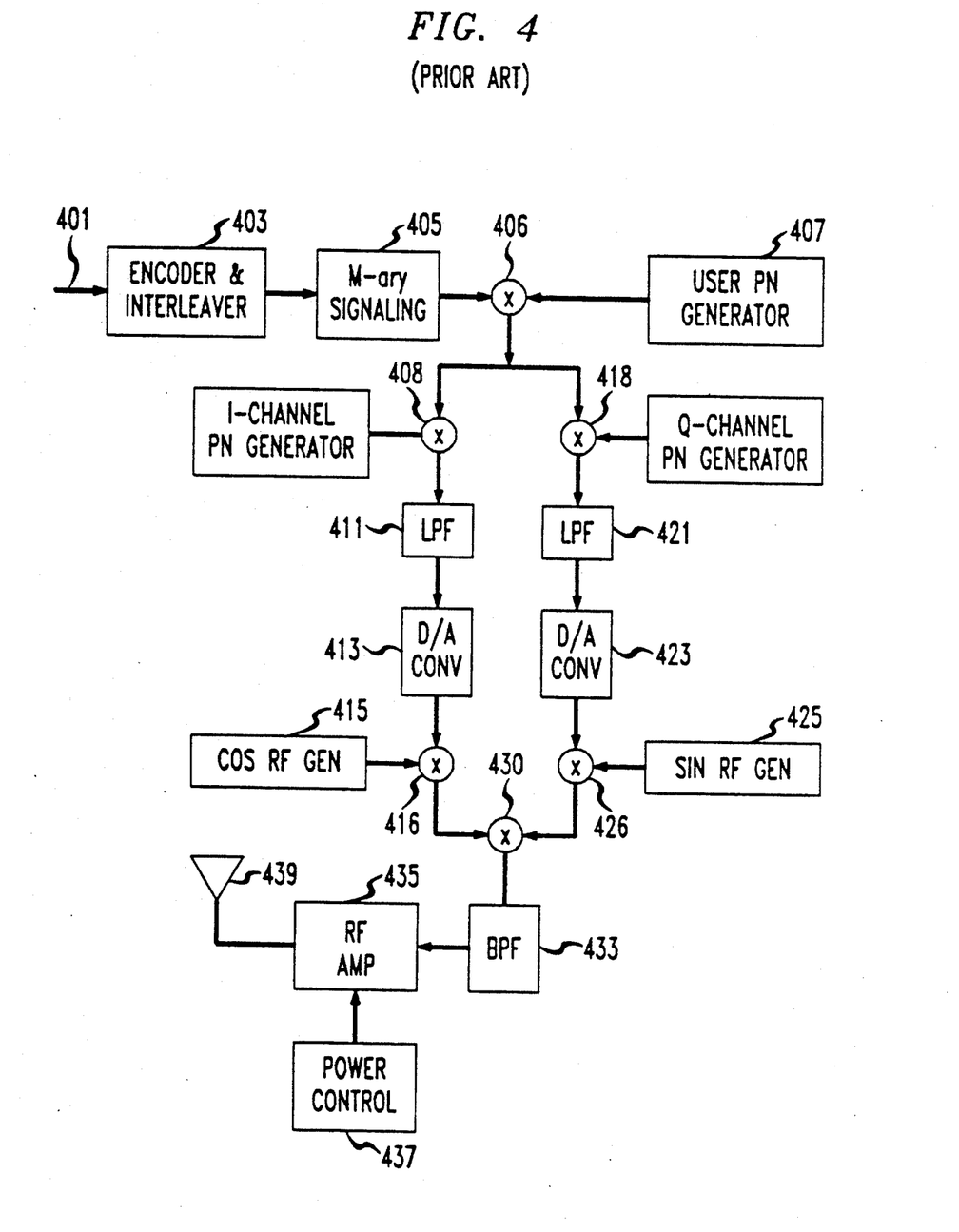
FIG. 4 is a block diagram of another radio transmitter that can be used in the CDMA system of FIG. 2.

Another detailed embodiment of a mobile radio transmitter for use in a CDMA transmission system is shown in FIG. 4. An encoded digital speech signal is applied to the input 401. This signal is encoded for noise and interference protection and interleaved in circuit 403 to reduce the effects of burst errors. The interleaved signal is modulated using M-ary orthoginal signalling, where M is an integer, in the M-ary signalling circuit 405

(Walsh functions are typically used). The modulated signal is spread in the multiplier 406 (e.g. an exclusive OR gate) in response to the users unique PN sequence supplied by the PN sequence generator 407. After the spreading, the signal is split into two channels that corresponds to an I channel (i.e. in phase) and a Q channel (i.e. quadrature phase). The I and Q signals are further spread in each channel in the multipliers 408 and 418 respectively. These PN sequences are generated by the I channel PN generator and the Q channel PN generator respectively. In each channel the spread signal is filtered by a low pass filter 411 or 421 and converted to analog form by a digital-to-analog converter 413 or 423. The signal in the I channel is converted to RF frequency by the modulator 416 in response to the cosine RF generator 415. The Q channel signal is modulated to an RF frequency in the modulator 426 in response to the sin RF generator 425. The I and Q signals are combined in the summing circuit 430 and filtered by the band pass filter 433. The filtered signal is amplified by an RF amplifier 435 and coupled to the antenna 439 for transmission. Transmission power is controlled by the power control 437 which is operative to control power in order to reduce interchannel interference.

Figure 5:
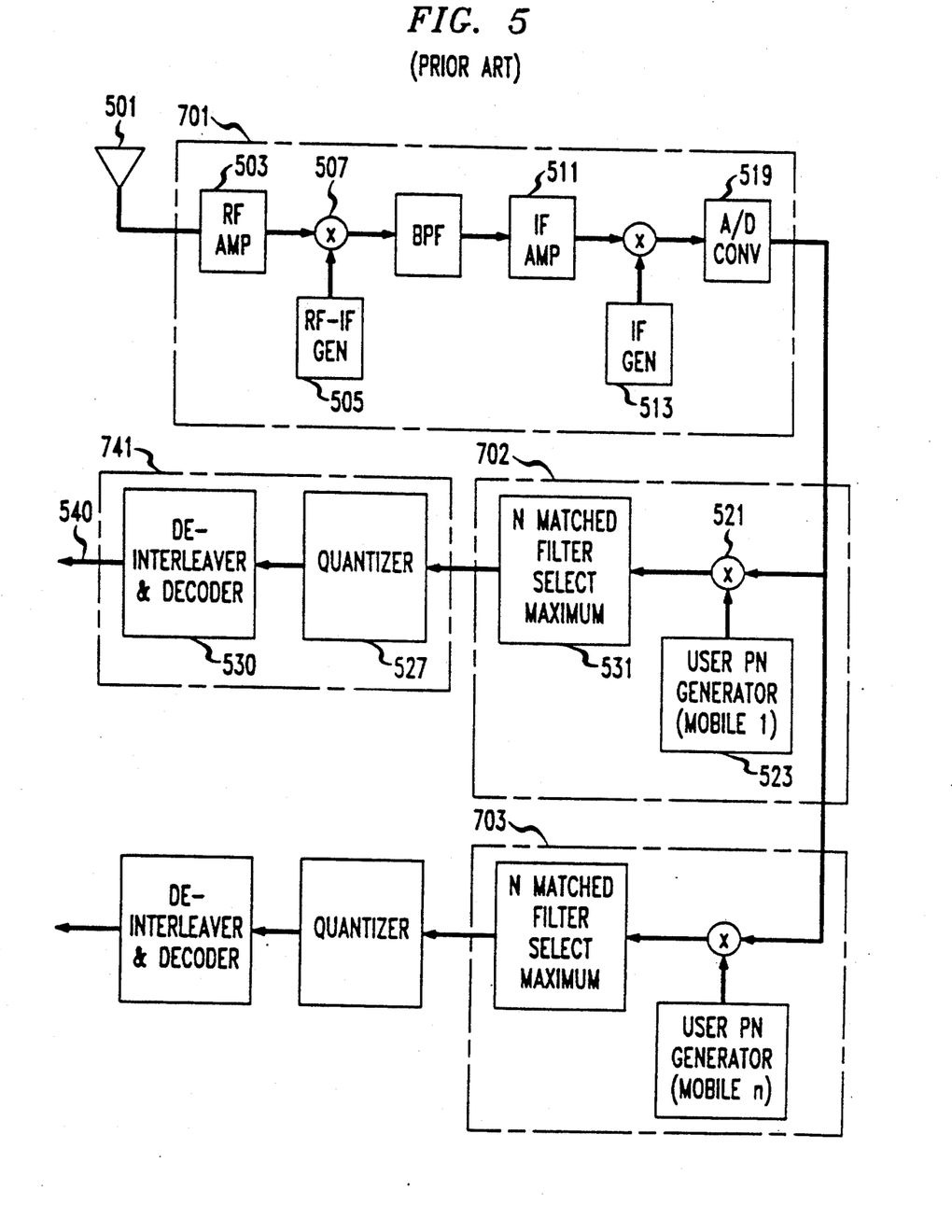
FIG. 5 is a block diagram of a cell-site receiver such as used in the CDMA system shown in FIG. 3.

An exemplary cell-site receiver, for use with a system using mobile transmitters such as shown in FIG. 3, is shown in FIG. 5. The sum of of analog signals transmitted by all mobile transmitters is received by the antenna 501, amplified by RF amplifier 503 and converted to the intermediate frequency provided by the IF generator 505 in the mixer 507. The IF signal is amplified by IF amplifier 511 and converted to a digital signal by the analog to digital converter 519 after shifting to the baseband frequency. A separate receiving path exists for each channel wherein the signal pertinent to that channel is despread by the spreading code of that channel. The signal for the channel of the mobile unit number one is despread in the multiplier 521 in response to the user PN signal applied by the user PN generator 523. The despread signal is coupled to a bank of matched filters and maximum symbol detectors 531. The filtered output signal having the greatest magnitude is quantized into limited levels by the quantizer 527 and applied to the de-interleaving and decoding circuit 530. The de-interleaved and decoded signal is applied to lead 540 which is coupled to subsequent speech decoding apparatus.

Figure 6:
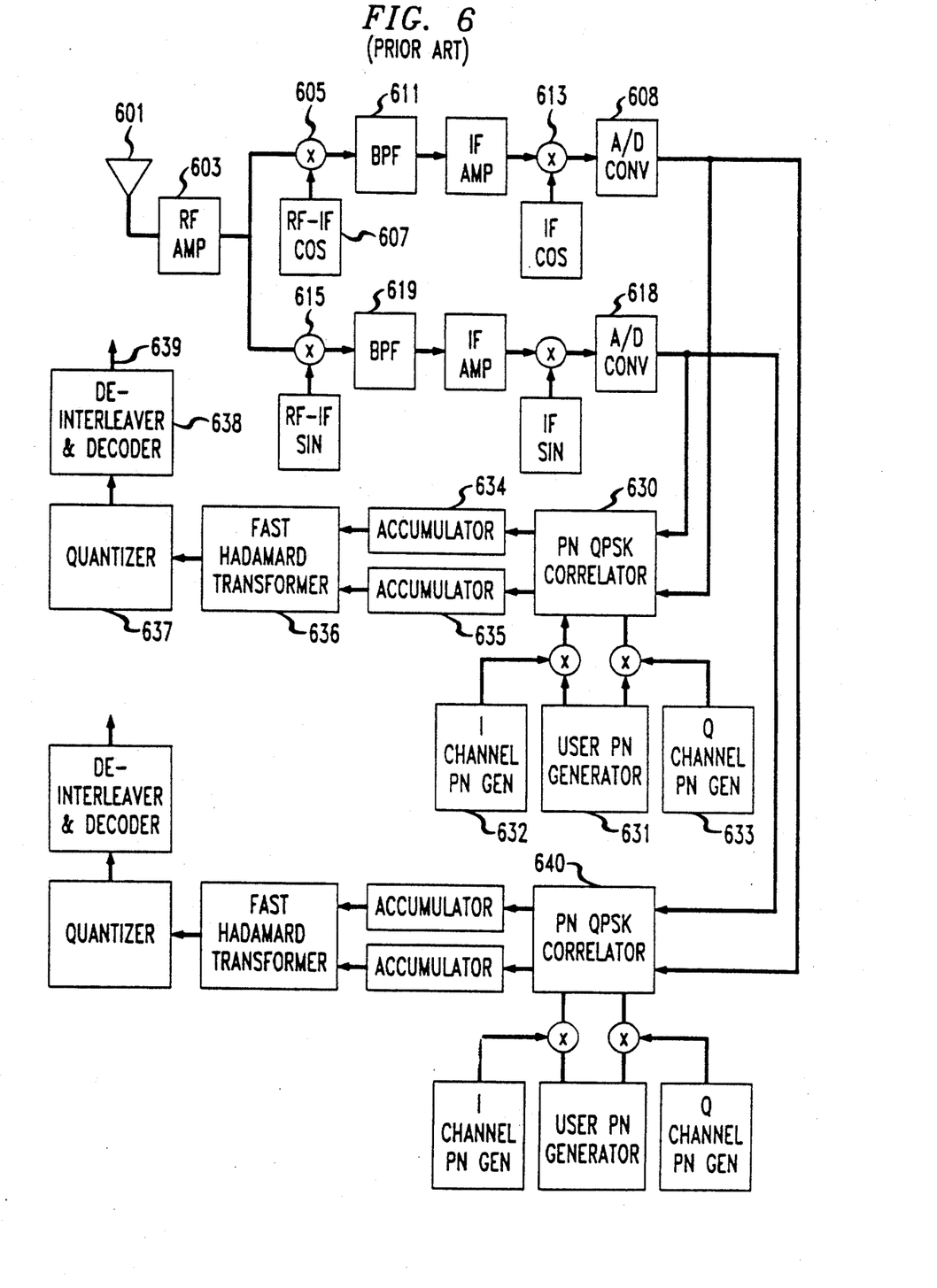
FIG. 6 is another detailed block diagram of the cell-site receiver shown in FIG. 4.

Another exemplary cell-site receiver, for use with a system using mobile transmitters such as shown in FIG. 4, is shown in FIG. 6. The signals transmitted by all the mobiles are received by the receiving antenna 601 and amplified by the RF amplifier 603. This received signal is split into its I channel and Q channel components. The received I channel analog signal is coupled to the mixer 605 and mixed with the signal output of the (RF-IF) cosine generator 607. The signal is filtered in the bandpass filter 611 and applied to the IF mixer 613 to convert the signal to the baseband frequency. The resulting baseband signal is converted to digital form in the analog-to-digital converter 608. A similar processing path is provided for the Q channel signals. It includes the mixer 615, the bandpass filter 619, mixer 623 and the analog-to-digital converter 618.

Both the I channel and Q channel signals are applied to the PN QPSk correlator 630 and the PN QPSk correlator 640. Each correlator is operative to correlate the signal with the user's particular PN sequence and the I and Q channel PN sequences, respectively. These sequences in one of the receiving channels are provided by the user PN generator 631, the I channel PN sequence generator 632 and the Q channel PN sequence generator 633. The accumulators 634 and 635 accumulate the output of the correlator 630 for a predefined chip period and couple these accumulated signals to a Fast Hadamard Transform processor 636 that produces a set of M coefficients for every input symbol. The M coefficients are multiplied by a weighting function in the quantizer 637. The signal is de-interleaved and decoded in the circuit of block 638 and the output on lead 639 is coupled to a speech decoder.

Figure 7:
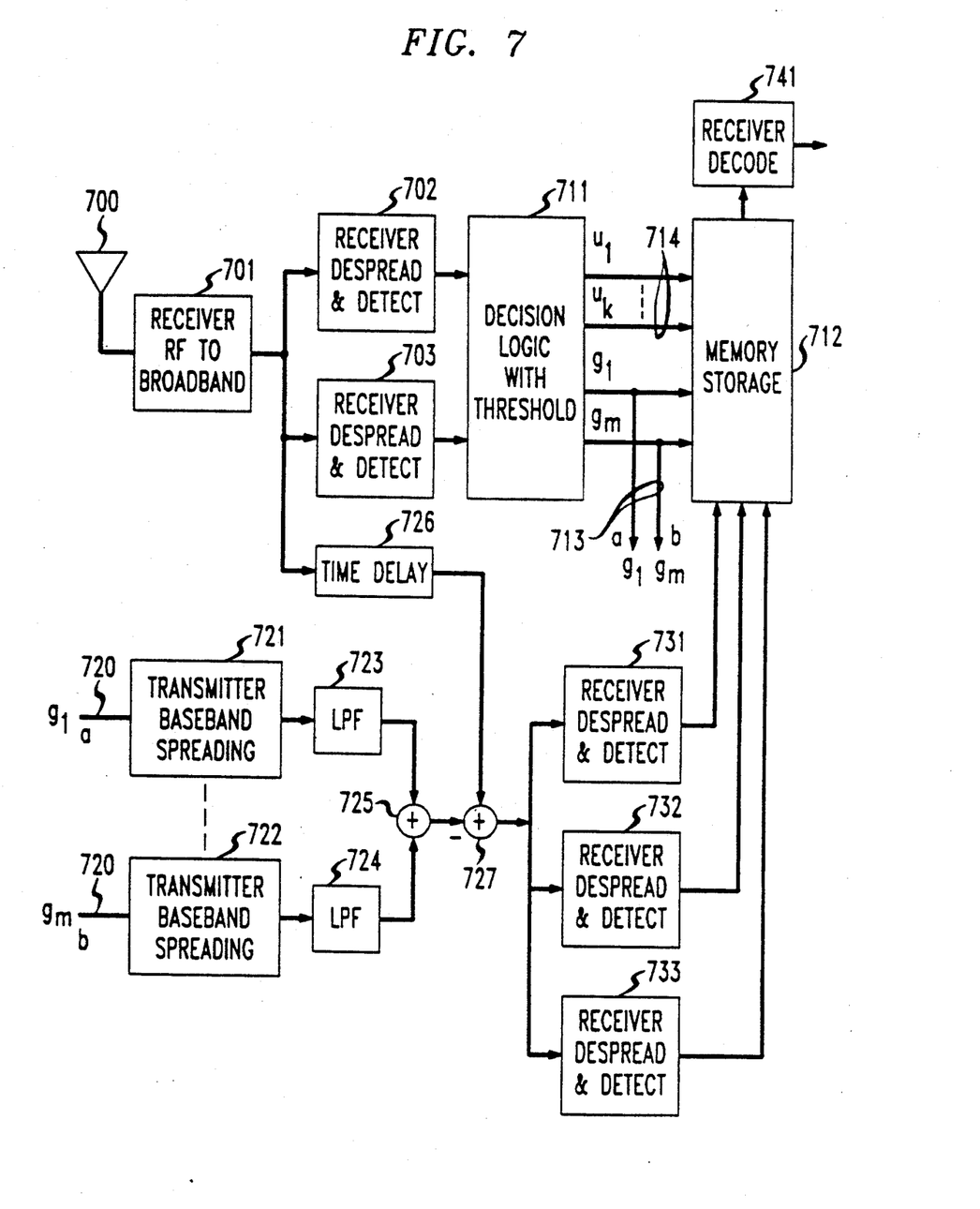
FIG. 7 is a block diagram of a radio receiver embodying the principles of the invention.

A block diagram or a cell site receiving apparatus operating according to the principles of the invention is disclosed in FIG. 7. The signals transmitted by the mobile radiotelephone units are received by the antenna 700. This received signal is applied to the signal receiver module 701. This signal receiver module 701 receives the incoming signal, converts the RF frequency down to the baseband frequency and digitizes the received analog signal. These digitized signals are applied to the receiver modules 702 and 703, which represent the individual channel branches of the receiver. The signal is despread in each individual branch with the spreading code applicable to that channel. The components of the modules 701, 702 and 703 may be identical to the component enclosed by the dotted lines 701, 702 and 703 shown in FIG. 5.

The detected and despread outputs of receiver modules 702 and 703 are applied to a decision logic circuit 711 which compares the signal in each channel to a threshold level to make a hard decision and to determine the likelihood of the signal in each channel being correct. The decision logic circuit 711 divides the signals into the categories of as probably correct signals ("g" signals on leads 713) and probably incorrect signals ("u" signals on leads 714) and applies the signals in both categories to a memory storage circuit 712. This decision logic circuit may comprise a three level hard decision decoder having zero, one and erasure levels. "u" signals would be associated with any symbols containing the erasure level while the "g" signals would be associated with symbols with one or zero levels. The signal output of the decision logic circuit 711 both certain and uncertain is applied to and stored in the memory circuit 712.

The signals "g" (on leads 713, a and b) having a high likelihood of being correct are applied to pseudo-transmitters 721 and 722 (to leads 720, a and b) to modulate and spread the baseband signal using the spreading codes assigned to the individual channels. The components of the pseudo-transmitter may include the components included within the box 721 shown in FIG. 3. These spread signals are passed through the low-pass filters 723 and 724 respectively which simulate the effect of all the filters incurred in the original transmission of the signals of the mobile units. These signals are then all summed in the summing circuit 725.

A time delay circuit 726 is connected to the output of the module 701 with a delay equal to the time required for a signal to travel from the output of module 701 to the input of module 727. The delayed signal is subtracted in difference circuit 727 from the summed signal output of the summing circuit 725. The resulting difference signal is split into several branches equaling the number of "u" channels and applied to pseudo-receiving circuits 731-733 to recover the original information signals representing the uncertain signals "u". The circuits 731-733 use the despreading codes for the channels of the uncertain signals "u". The "u" signal outputs of these pseudo-receiving circuits are applied to the memory circuit 712 where they are applied to overwrite the orginally probably incorrect signals "u" stored therein. These "u" signals are now more likely to be correct and are applied to the pseudo-receiver 741 (see FIG. 5) for further error correction and decoding.

Figure 8:
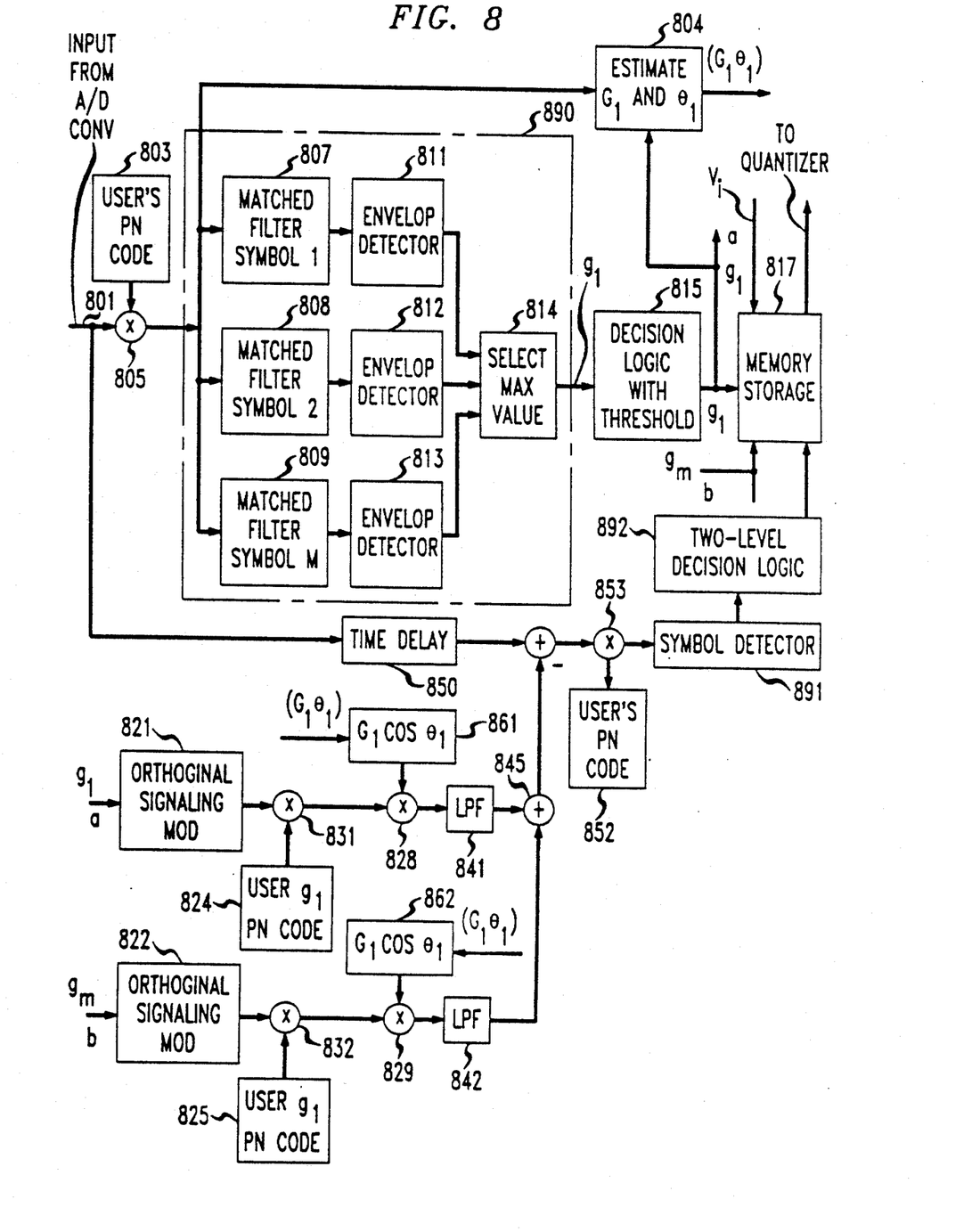
FIG. 8 is a block diagram of the receiver of FIG. 7 in use with the receiver apparatus shown in FIG. 5.

A more detailed diagram of a portion of the receiver of FIG. 7, embodying the principles of the invention, is shown in FIG. 8. This portion represents the receiver for one particular one of the channels. The other channel receivers are identical to this receiver portion. This particular channel receiver portion is, for illustrative purposes, assumed to receive a good symbol signal. The memory storage 817 is common to all receiver portions and the pseudo-transmitters may serve for all channels. The received signal after it is converted to a digital signal is applied to the input lead 801. The user's PN code 803 is applied to multiplier 805 and the output is applied to a plurality of matched filters 807, 808 and 809. The filtered output is in turn applied to the envelop detectors 811, 812 and 813, respectively. The maximum value is detected by the selector circuit and applied to the decision logic circuit 815. The output of this decision circuit 815 is applied and stored in the memory circuit 817.

The signals "g" deemed to be valid are applied to the orthoginal signaling modulators 821-822 and the various user PN codes 824-825 are applied to the multipliers 831 and 832 respectively. The estimated magnitude and phase of the signals from the previous stage (from blocks 861,862) are applied to the multipliers 828 and 829. These signals are derived from the estimation circuit 804 which estimates the signal phase shift $\theta$ and signal magnitude G of the received signal. This signal can be estimated from the received input signal and the "g" signal value. The outputs of these multipliers 828 and 829 are applied to the low pass filters 841 and 842. The outputs of these filters is summed in the summer 845. The output of the summer is subtracted from the output of the time delay circuit 850 and the information signal is recovered by applying the user's PN code 852 to multiplier 853. The output of multiplier 853 is applied to symbol detector 891 whose circuitry is identical to the circuitry of the receiver enclosed by dotted lines 890. The symbol detector output is applied to a two-level decision logic detector 892 which recovers the original digital code. This code is applied to the memory circuit 817 to overwrite the symbols of the "u" signals therein deemed to be invalid.

Figure 9:
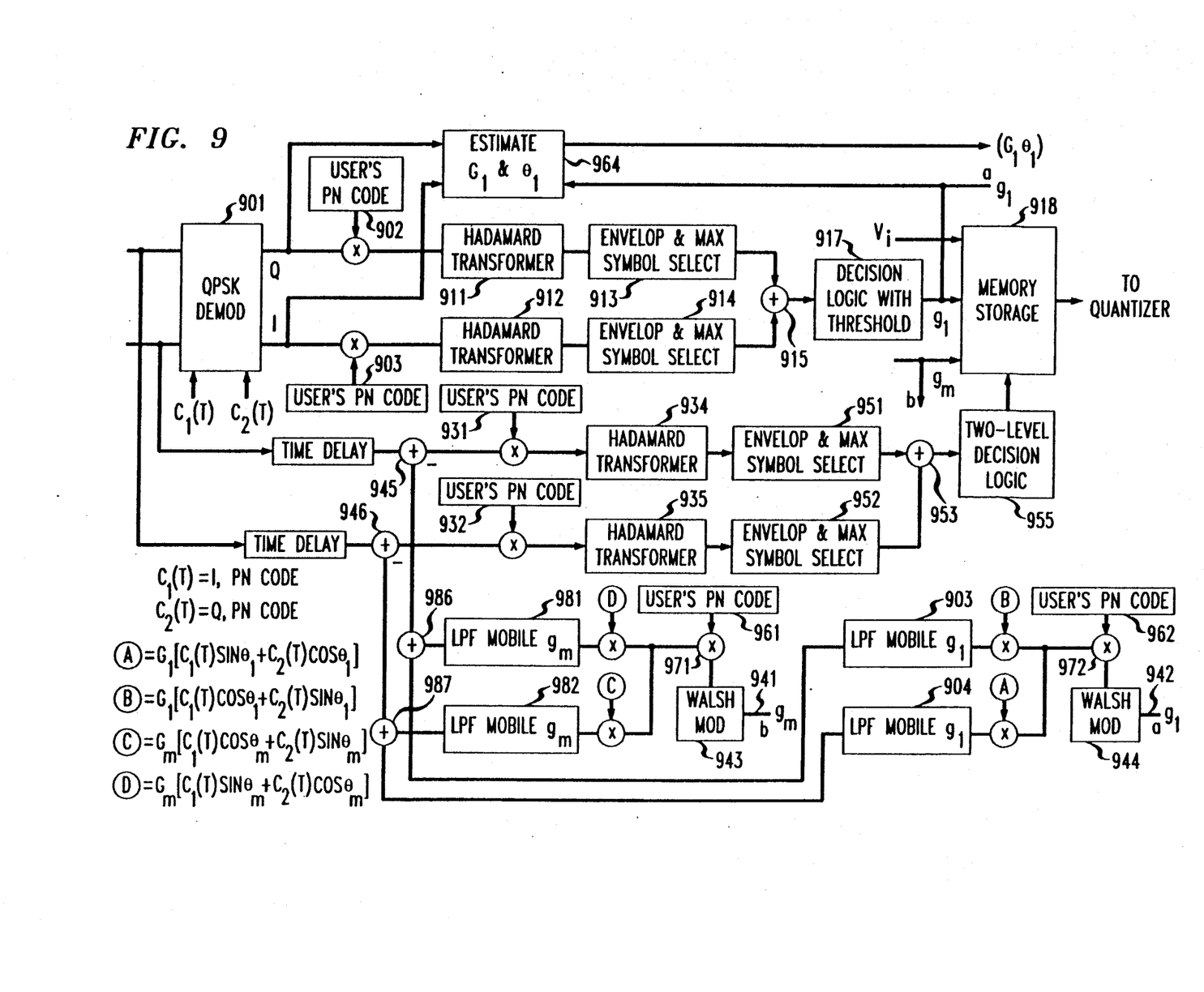
FIG. 9 is a block diagram of the receiver of FIG. 7 in use with the receiver apparatus shown in FIG. 6.

Another version of a receiver embodying the principles of the invention is shown in FIG. 9. As in FIG. 8 this circuitry in the detector portion is concerned with a particular channel and identical circuitry is used for the other channels. This version uses QPSK demodulation and divides the received signal into quadrature and in-phase components and applies the in-phase and quadrature-phase PN codes in the QPSK demodulator 901. The users PN codes 902 and 903 are applied to the in-phase and quadrature-phase signals via the multipliers 904 and 905. It uses Hadamard transformers 911 and 912 as part of the detection apparatus to convert the in-phase and quadrature-phase signals from a time base to a sequence base. As in the previous receivers the received signal is applied via the envelop detectors and maximum symbol selector circuits 913 and 914 and summing circuit 915 to the decision logic circuit 917. The detected symbols and erasure symbols are stored in the memory storage 918.

The signals "g" deemed valid are applied to pseudo-transmission equipment at leads 941 and 942. The signals are modulated by the M-ary Walsh sequence modulators. The user's spreading codes 961 and 962 are applied in the multipliers 971 and 972, respectively. These signals are multiplied in the in-phase and quadrature-phase paths with the estimated magnitude and phase derived from the estimating circuit 964 and filtered in the low pass filters 981-984. The in-phase and quadrature-phase "g" signals for each channel are summed in the summing circuits 986 and 987. These signal outputs of summing circuits 986 and 987 are again summed in summing circuits 945 and 946 with the delayed input signals as delayed by the time delay circuits 991 and 992. The output of the summing circuits 945 and 946 is a different signal in each channel each of which is multiplied with a use's PN code 931 and 932 and applied to a Hadamard transformer 934 and 935 respectively. Symbols are detected in the envelop detector and maximum symbol select circuits 951 and 952 and summed in the summing circuit 953. These detected symbols are applied to the two level decision logic circuit 955. Its symbol output is applied to the memory circuit 918 and used to overwrite the unsure symbols "u" stored therein.

I claim:

1. Apparatus for reception of radio signals in a CDMA spread spectrum radio transmission system, comprising:
   means for receiving radio signals comprising a plurality of radio channels encoded by CDMA spread spectrum techniques;
   means for despreading each radio signal in each radio channel;
   means for identifying signals having a high probability of correctness of channel signal information;
   means for identifying signals having a low probability of correctness of channel signal information;
   means for spreading the signals of the channels having a high probability of correctness of channel signal information;
   means for subtracting the output of the means for spreading from an output of the means for receiving radio signals to eliminate interference components from received radio signals; and
   means for recovering signals from the channels having a low probability of correctness of channel signal information.

2. Apparatus for reception of radio signals in a CDMA spread spectrum radio transmission system as claimed in claim 1, and comprising:
   the means for identifying signals with a high probability and the means for identifying signals with a low probability both comprise decision logic circuitry for detecting the signals having a high probability of correctness and encoding them with a logic level and for detecting the signals with a low probability of correctness and encoding them with a erasure level, and
   memory storage for storing the encoded signals having logic levels and erasure levels.

3. Apparatus for reception of radio signals in a CDMA spread spectrum radio transmission system as claimed in claim 1, and comprising:
   means for applying signals from the means for recovering signals to the memory and replace the signals with low probability of correctness with the recovered signals.

4. A radio receiver for receiving a plurality of radio channels in a CDMA spread spectrum radio communication system comprising:

a receiving antenna;

receiving circuitry for converting an RF signal received by the antenna into an IF signal;

circuitry for applying despreading codes to the IF signal to recover signals for each of the plurality of radio channels;

decision circuitry for evaluating the signals of each channel and identifying signals with a high probability of correctness and signals with a low degree of correctness;

memory storage for storing the signals of each channel;

coding circuitry for applying spreading codes to the signals having a high probability of correctness;

summing circuitry responsive to the coding circuitry for generating an IF broadband signal including all the encoded signals of the coding circuitry;

subtracter circuitry connected to receive a first input from the receiving circuitry and a second input from the summing circuitry and operative for generating an IF broadband difference signal representing a difference between the first and second input means for applying the despreading codes of the channels having a low probability of correctness to the IF broadband difference signal to recover the signal channels;

means for coupling the recovered signal channels to the memory storage; and output circuitry for outputing the stored signals from the memory storage.

5. A digital radio receiver for receiving a plurality of radio channels in a CDMA spread spectrum radio communication system, comprising:

receiving circuitry for converting an RF signal into an IF signal;

decoding circuitry for applying despreading codes to the IF signal to recover information signals for each of the plurality of radio channels;

wherein the improvement comprises:

decision circuitry having three level hard decision logic for evaluating the signals of each channel by comparing the signals to a threshold and converting signals having a high probability of correctness to a logic level and converting signals with a low probability of correctness to an erasure level;

memory storage for storing output signals of each channel as supplied by the decision circuitry;

pseudo transmission circuitry for applying spreading codes to the signal output of the decision circuitry having a high probability of correctness to produce broadband signals; and including summing circuitry for summing the broadband signals;

means for deriving a difference signal representing the difference between the broadband signal and the signal output of the receiving circuitry;

means for applying the despreading codes of the signals having a low probability of correctness to the broadband signal derived from the difference signal to recover the original signal transmitted; and means for coupling the recovered signals to the memory storage to overwrite erasure signals contained therein; and output circuitry for outputting the stored signals from the memory storage.

6. A method of reducing the influence of multiple access interference in a direct sequence spread spectrum radio receiver, comprising the steps of:

recovering narrow band signals from a transmitted broadband spread spectrum signal by applying spreading codes as originally applied to transmitted narrowband signals and storing these recovered signals in a memory circuit;

selecting the recovered signals stored in the memory circuit having an expectation of correctness as determined by comparing the detected signals with a logic threshold;

spreading the selected signals having an expectation of correctness into a second broadband spread spectrum signal;

delaying the transmitted broadband spread spectrum signal and summing the delayed signal with the second broadband spread spectrum signal to generate a difference signal representing a difference between them; and recovering new narrow band information signals from the difference signal and replacing stored signals in the memory with an expectation of incorrectness with the new narrow band information signals.

7. A method of reducing the influence of multiple access interference in a direct sequence spread spectrum radio receiver, as claimed in claim 6 and further comprising the steps of:

time delaying the received broadband signal prior to despreading and summing it with the second broadband signal.

* * * * *